April 5, 1966　　　A. L. MILLER　　　3,244,166

WATER HEATING AND STORAGE SYSTEM

Filed July 13, 1964

INVENTOR.
AVY L. MILLER
BY Fulwider, Patton, Rieber,
Lee, and Utecht
ATTORNEYS

United States Patent Office 3,244,166
Patented Apr. 5, 1966

3,244,166
WATER HEATING AND STORAGE SYSTEM
Avy L. Miller, 13246 Saticoy St.,
North Hollywood, Calif.
Filed July 13, 1964, Ser. No. 382,306
11 Claims. (Cl. 126—362)

The present invention relates generally to water heating and storage systems, and more particularly to installations where large volume demands of relatively hot water are required from time to time.

Such demands for hot water occur, for example, in establishments employing automatic dish-washing equipment and other devices which intermittently demand large volumes of hot water such as at or about 180° F. The demand requirement is for the supply of this hot (180° F.) water over the entire demand period so that not only must the water be stored at the high temperature required, but the store must supply the entire quantity desired at substantially this high temperature.

Each withdrawal of hot water from a hot water storage tank causes an influx of relatively cold water into the tank where in most systems it mixes with the hot water therein, thus reducing the temperature of the mixed water in the tank. While recirculation of the mixed lower temperature water through the heater of the system will eventually bring it to the desired high storage temperature, it is in the interim impossible to obtain water from the storage tank at the desired high temperature.

The system of applicant's Patent No. 2,833,273 granted May 6, 1958, for Hot Water Storage Tank and Water Heater System Embodying the Same, solves the problem of lowered temperature of the water in the storage tank after withdrawal of the water therefrom by establishing an interface between the high temperature water in the upper part of the tank and the lower temperature water supplied to the tank, whereby the stored high temperature water and the incoming low temperature water are maintained substantially separate without mixing. Thereby a major portion of the original high temperature water in the tank can be withdrawn therefrom while maintaining its temperature substantially constant. This is effected, in the structure of applicant's patent, by restricting turbulence within the storage tank to a mixing chamber which is in communication with the circulating system to the heater in which the water temperature is raised. The circulation of hot water out of the mixing chamber and of cold water thereinto is effected relatively slowly so that there is no turbulence in the main body of the storage tank and the interface is not disturbed but moves intact, upwardly with removal of hot water from the tank and slowly downwardly with the addition of hot water to the tank from the mixing chamber.

While the structure of applicant's patent functions as described for lower circulation rates through the water heater, it has been found that increase in the circulation rate may interfere with the integrity of the interface between the hot and cold water and no longer permit the withdrawal of the desired large quantity of water at substantially the same high temperature. Such increased water heater circulation rates are desirable in many applications from the standpoint of heat input and system temperature recovery rate, but more importantly, so as to secure high speed turbulent flow through the heat exchange tubes of the heater to avoid scaling and keep the interior surfaces of the tubes clean.

It is, therefore, an object of the present invention to provide an improved water heating and storage system in which an interface is maintained between high temperature water stored in a tank and cooler water brought into the bottom of the tank regardless of a high circulation rate through the water heater of the system.

Another object of the present invention is the provision of an improved water heating and storage system providing for the intermittent supply of relatively large volumes of hot water at substantially constant temperature from a relatively small storage tank.

Another object of this invention is the provision of an improved water heating and storage system having a hot water storage tank wherein incoming replacement cold water is substantially prevented from mixing with high temperature water remaining in the storage tank while circulating water at a righ rate between the storage tank and the water heater of the system.

A further object of this invention is the provision of an improved water heating and storage system having a hot water storage tank which maintains separation between the hot water remaining in the storage tank and incoming cool water replacing water withdrawn from the tank, while providing for rapid circulation through a heating loop outside the tank to provide turbulent flow to clean the heat exchange tubes of the loop.

These and other objects and features of the invention will be apparent to those skilled in the art from the following specification and the appended drawing, in which.

Figure 1:
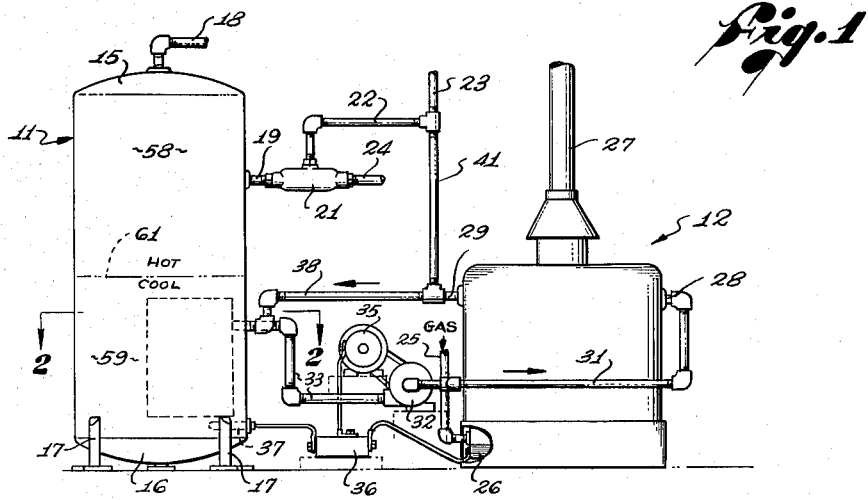
FIGURE 1 is an elevational view of a water heating and storage system according to the present invention.

The system illustrated in FIGURE 1 includes a storage tank indicated generally at 11 and a water heater 12 which may be of conventional gas-fired construction. The storage tank 11 is represented with an outer casing 13 and an inner lining 14 and top and bottom closing caps 15 and 16, respectively, the tank being supported in vertical position by means of legs 17 welded or otherwise secured adjacent the bottom thereof, and having feet engaging the supporting surface to mount the tank in upright position. The storage tank 11 has a hot water outlet conduit 18 connected through its top cap 15 and a second hot water outlet 19 leading to a thermostatic mixing valve 21 which is also fed by a line 22 from a cold water supply main 23 to deliver at conduit 24 a lower temperature mixture, for example, 140° F. for personal use. The water heater 12 is fed from a gas source 25 through a thermostatic control 26 into conventional burners which burn the gas as fuel and pass the products of combustion across heat exchange tubes (not shown) to the stack 27. The heat exchange tubes have an inlet at 28 and an outlet at 29.

The inlet 28 to the heat exchange tubes of the heater 12 is connected by a conduit 31 to the outlet of a pump 32, the inlet to which is connected by a conduit 33 to an outlet pipe 34 from the storage tank 11. The pump 32 is driven by an electric motor 35 and the motor 35 and solenoid valve 26 are controlled from a thermostatic relay 36 under the control of a thermostat 37 within and adjacent to the bottom of the storage tank 11. The outlet 29 from the heat exchange tubes in the heater 12 is connected through a conduit 38 to the storage tank inlet pipe 39. The cold water supply main can be connected to the conduit 38 through a conduit 41 or the cold water supply to the storage tank may be connected to the bottom of the storage tank, either beneath a diffuser plate or the bottom of the diffuser chamber to be hereinafter described.

Figures 2, 3:
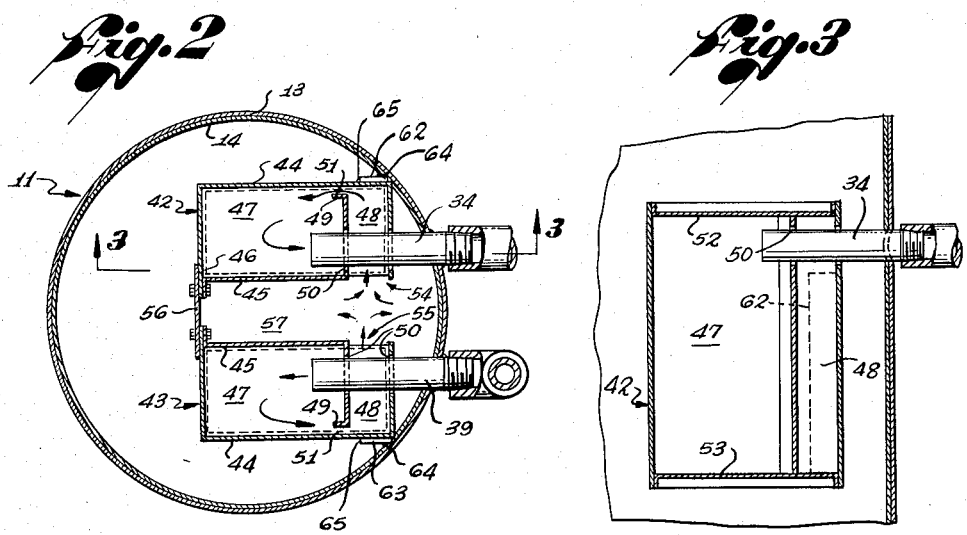
FIGURE 2 is a horizontal sectional view through the storage tank on line 2—2 of FIGURE 1.
FIGURE 3 is a vertical sectional view through the withdrawal chamber of the heating loop taken on line 3—3 of FIGURE 2.

The ends of the pipes 34 and 39 are disposed within generally rectangular cans 42 and 43, respectively. Each of the cans 42 and 43 is made up of a vertically disposed member 44, U-shaped in horizontal section, and a vertically disposed member 45, L-shaped in horizontal section, connected together at 46, as by welding, to form an interior chamber 47 and a passageway 49 formed between adjacent parallel legs of the U-shaped and L-shaped members. The passageways 48 communicate with the chambers 47 between the ends 49 of the legs of the L-shaped members forming the passageways 48 and the bight wall of the U-shaped members and thereby form therebetween elongated metering openings 51 which serve to distribute the flow of water along the entire height of the passageways 48 and also determine the rate of flow through the heater circulating loop. The cans 42 and 43 are provided with top and bottom closures 52 and 53 so that the only inlet into the can 42 is through an opening 54 into the passageway 48 and the only exit from the can 43 is through opening 55 from its passageway 48. The openings 54, 55 are elongated vertically and disposed in opposed relation, as shown more particularly in FIGURES 2 and 3.

A pair of attachment straps 62 and 63 are welded to the interior surface of the tank casing 13, as at 64, are spaced apart at the desired spacing for the bight walls of the U-shaped members 44 of the cans 42 and 43, and the bight walls are welded thereto, as at 65, to rigidly mount the cans 42 and 43 within the tank in positions illustrated in the drawings. The pipes 34 and 39 extend through clearance openings 50 through the spaced legs of the members 44 and 45 into the chambers 47 in the cans 42 and 43.

A plate 56 is bolted between the cans 42 and 43 at their backs so as to form, with the long legs of the L-shaped members 45, a diffuser chamber 57 open to the top and bottom and extending at the front to the adjacent surface of the liner 14 of the storage tank 11. Water returning to the tank from the heater circulating loop through the pipe 39 passes slowly from the opening 55 into the diffuser chamber 57, and water to be circulated through the heater circulating loop slowly enters the opening 54 from the diffuser chamber 57. The interface established in the storage tank 11 between the hot water remaining in the upper part 58 of the tank and the replenishing cold water in the lower part 59 of the tank is indicated in FIGURE 1 by the line 61.

In the operation of the water heating and storage system according to the present invention, whenever cool water is present at the thermostat 37, the thermostatic relay 36 energizes both the electric motor 35 and the solenoid valve 26 to both circulate water through the heater 12 and supply combustion fuel to be burned in the heater to raise the temperature of the circulating water. This circulation of water through the heater circulating loop and the application of heat to the circulating water therefore continues until the entire tank 11 is full of hot water so that the thermostat 37 is satisfied, at which time both the supply of combustion fuel and the circulation of water through the heater are discontinued. Hot water is withdrawn from the tank 11 either through the high temperature water supply conduit 18 or through the warm water supply conduit 24. In either case the hot water which is withdrawn from the tank is replaced by cold water from the supply main, either through pipe 41 into the heater circulatory loop or directly into the bottom of the tank, as previously described. This cool or cold water will, because of its greater density, tend to stay in the bottom portion 59 of the tank 11 and in the absence of turbulence will not mix with the hot water remaining therein, but will form an interface, as at 61, with the remaining hot water in the upper portion 58 of the tank.

It is desired to raise the temperature of the cool water in the lower portion 59 of the tank by circulating it through the heater 12 but without causing sufficient turbulence in the interior of the tank 11 to destroy the interface 61 and cause mixing of the hot and cold water in the tank and resultant lowering of the temperature of the mixed water. It will be readily understood that while the interface 61 is maintained, the major portion of the hot water thereabove may be withdrawn from the tank at substantially constant temperature, thus supplying a large volume of constant temperature water from a relatively small storage tank.

The rate of flow of water through the heater circulating loop is controlled by the capacity of the system, including the metering openings 51 between the passageways 48 and the chambers 47 of the cans 42 and 43. This flow in the loop outside the tank 11 is desirably at a high rate to cause turbulence in and keep clean the heat exchange tubes in the heater 12, but very slow in the diffuser chamber 57 to prevent turbulence in the tank 11. Water enters the can 42 by way of its passageway 48 through the opening 54 from the diffuser chamber 57, some portion of this water coming directly across the diffuser chamber from the discharge opening 55 from can 43 and other portions of the water entering the circulatory system coming from different locations in the diffuser chamber, including from below and from opposite sides of the entrance opening 54. Water which has circulated through the heater 12 and had its temperature raised therein, leaves the circulating loop through the pipe 39 into the chamber 47 of the can 43 and leaves the chamber 47 through passageway 48 and discharge opening 55 into the diffuser chamber 57.

The water flows through the relatively small diameter pipe 39 at high velocity into the large chamber 47 in can 43 where its movement is greatly slowed. The restricted passage 51 holds back immediate flow out of the chamber 47 at the level of pipe 39 and spreads out the flow from chamber 47 into passageway 48 over substantially the entire height of passageway 48 and the large area of flow results in very slow movement through passageway 48 and opening 55 into the diffuser chamber 57. The restricted passage 51 in can 42 similarly spreads out the flow into chamber 47 therein over substantially the entire height of its passageway 48 to utilize the entire area of the opening 54. The flow across the diffuser chamber 57 between openings 55 and 54 therefore occurs over a large area at a very slow rate. The only exposure of the loop flow to the contents of the tank is at the diffuser chamber 57 and this slow movement thereacross is accomplished without causing turbulence in the water in the tank and the integrity of the interface 61 is maintained.

Part of the heated water will circulate directly across the diffuser chamber 57 and into the entrance opening 54 for the circulating loop. Other portions of the heated water will diffuse into the chamber 57 to opposite sides of the discharge opening 55 and also and principally upwardly therefrom, since its heated condition has lowered its density. This heated water therefore mixes with the cool water in and above the diffuser chamber 57 and rises at a very slow rate, without turbulence, to the interface 61 which, if its temperature is high enough, it crosses to become a part of the hot water stored in the upper portion 58 of the tank, thereby lowering the interface.

While a certain preferred embodiment of the present invention has been specifically illustrated and described, it will be understood that the invention is not limited thereto, as many variations will be apparent to those skilled in the art, and the invention is to be given its broadest interpretation within the terms of the following claims.

I claim:

1. A water heating and storage system comprising: a hot water storage tank; a water heater; a water circulating loop interconnecting said tank and heater, said loop including water intake and discharge pipes extending into the lower portion of said tank; means forming an individual chamber about the end of each of said pipes large in volume compared to the capacity of the pipes whereby a rapid flow through the pipes is slowed in the chambers therearound; and means providing openings communicating said chambers with the interior of the tank, said openings being large in area compared to the cross-sectional area of the pipes whereby the flow between the openings is effected at a slow rate regardless of rapid flow through the pipes.

2. A water heating and storage system comprising: a hot water storage tank; a water heater; a water circulating lop interconnecting said tank and heater, said loop including water intake and discharge pipes extending into the lower portion of said tank; means forming an individual chamber about the end of each of said pipes large in volume compared to the capacity of the pipes whereby a rapid flow through the pipes is slowed in the chambers therearound; and means providing openings communicating said chambers with the interior of the tank, said openings being large in area compared to the cross-sectional area of the pipes whereby the flow between the openings is effected at a slow rate regardless of rapid flow through the pipes, said openings being disposed in opposed, horizontally spaced, vertical planes.

3. A water heating and storage system comprising: a hot water storage tank; a water heater; a water circulating loop interconnecting said tank and heater, said loop including water intake and discharge pipes extending into the lower portion of said tank; enclosing means forming an individual chamber about the end of each of said pipes large in volume compared to the capacity of the pipes whereby a rapid flow through the pipes is slowed in the chambers, said enclosing means being disposed in horizontally spaced relation to form therebetween a diffuser chamber communicating at the top and bottom with the interior of the tank; and means providing a horizontal opening communicating each pipe chamber with the diffuser chamber, said openings being large in area compared to the cross-sectional area of the pipes.

4. A water heating and storage system comprising: a hot water storage tank; a water heater; a water circulating loop interconnecting said tank and heater, said loop including water intake and discharge pipes extending into the lower portion of said tank; enclosing means forming an individual chamber about the end of each of said pipes large in volume compared to the capacity of the pipes whereby a rapid flow through the pipes is slowed in the chambers, said enclosing means being disposed in horizontally spaced relation to form therebetween a diffuser chamber communicating at the top and bottom with the interior of the tank; means providing a horizontal opening communicating each pipe chamber with the diffuser chamber, said openings being large in area compared to the cross-sectional area of the pipes; and means forming horizontally restricted, vertically extending passages connecting said chambers and openings so as to spread out the flow through the openings over substantially the entire vertical height thereof.

5. A water heating and storage system comprising: a hot water storage tank; a water heater; a water circulating loop interconnecting said tank and heater, said loop including water intake and discharge pipes extending into the lower portion of said tank; enclosing means forming an individual chamber about the end of each of said pipes large in volume compared to the capacity of the pipes whereby a rapid flow through the pipes is slowed in the chambers, said enclosing means being disposed in horizontally spaced relation to form therebetween a diffuser chamber communicating at the top and bottom with the interior of the tank; and means providing a horizontal opening communicating each pipe chamber with the diffuser chamber, said openings being large in area compared to the cross-sectional area of the pipes, said openings being mounted in horizontally opposed relation so that flow therebetween across the diffuser chamber is substantially horizontal and at a very slow rate regardless of rapid flow through the circulating loop.

6. A water heating and storage system comprising: a hot water storage tank; a water heater; a water circulating loop interconnecting said tank and heater, said loop including water intake and discharge pipes extending into the lower portion of said tank; enclosing means forming an individual chamber about the end of each of said pipes large in volume compared to the capacity of the pipes whereby a rapid flow through the pipes is slowed in the chambers, said enclosing means being disposed in horizontally spaced relation to form therebetween a diffuser chamber communicating at the top and bottom with the interior of the tank; means providing a horizontal opening communicating each pipe chamber with the diffuser chamber, said openings being large in area compared to the cross-sectional area of the pipes; and means interconnecting said enclosing means to close off the diffuser chamber against horizontal communication with the interior of the tank.

7. A water heating and storage system comprising: a hot water storage tank; a water heater; a water circulating loop interconnecting said tank and heater, said loop including water intake and discharge pipes extending into the lower portion of said tank; enclosing means forming an individual chamber about the end of each of said pipes large in volume compared to the capacity of the pipes whereby a rapid flow through the pipes is slowed in the chambers, said enclosing means being disposed in horizontally spaced relation to form therebetween a diffuser chamber communicating at the top and bottom with the interior of the tank; means providing a horizontal opening communicating each pipe chamber with the diffuser chamber, said openings being large in area compared to the cross-sectional area of the pipes, each of said enclosing means comprising a vertically elongated can having a vertically extending passageway at one horizontal end, which passageway communicates at one end with the diffuser chamber by a large area opening; and means forming a horizontally restricted passage between said chamber and passageway extending for the full height of said chamber and passageway to spread out the flow therebetween to the full height thereof whereby flow into and out of the passageway openings occurs over a large area compared to the cross-sectional area of the loop pipes.

8. A storage tank for a water heating and storage system comprising: a cylindrical casing; top and bottom closures for said casing; means for supporting said tank with the axis of the casing vertical; inlet and outlet pipes extending through said tank casing in the lower portion thereof for connection to a circulatory heating loop; an enclosure about the interior end of each of said pipes forming a chamber thereabout large with respect to the capacity of the pipes whereby rapid flow through the pipes is slowed in the chambers; and an opening communicating each chamber with the interior of the tank, said openings being disposed in vertical planes in horizontally opposed relation and being large in area compared to the cross-sectional area of the pipes.

9. A storage tank for a water heating and storage system comprising: a cylindrical casing; top and bottom closures for said casing; means for supporting said tank with the axis of the casing vertical; inlet and outlet pipes extending through said tank casing in the lower portion thereof for connection to a circulatory heating loop; an enclosure about the interior end of each of said pipes forming a chamber thereabout large with respect to the capacity of the pipes whereby rapid flow through the pipes is slowed in the chambers; an opening communicating each chamber with the interior of the tank, said openings being disposed in vertical planes in horizontally opposed relation and being large in area compared to the cross-sectional area of the pipes, each of said enclosures comprising a vertically elongated can having a vertically extending passageway at one horizontal end terminating in said communicating opening; and means forming a horizontally restricted passage between said chamber and passageway to spread out the flow therebetween to the full height thereof whereby flow into and out of the openings occurs over the full height thereof.

10. The storage tank defined in claim 9 in which said cans are mounted in horizontally spaced relation to form a diffuser chamber therebetween, and in which said openings are disposed in horizontally spaced relation at opposite sides of said diffuser chamber.

11. The storage tank defined in claim 10 in which a vertical wall interconnects the ends of the cans to close off the diffuser chamber against horizontal communication with the tank interior thereat and in which the diffuser chamber communicates at the top and bottom with the tank interior.

References Cited by the Examiner
UNITED STATES PATENTS

| | | | |
|---|---|---|---|
| 2,505,203 | 4/1950 | Piper | 126—362 |
| 2,833,273 | 5/1958 | Miller | 126—362 |

FREDERICK L. MATTESON, JR., *Primary Examiner.*

ROBERT A. DUA, *Assistant Examiner.*